United States Patent [19]
Taylor et al.

[11] Patent Number: 5,430,969
[45] Date of Patent: Jul. 11, 1995

[54] FISH HOOK AND LURE COVER

[76] Inventors: Don Taylor, 64 Lafferty Street, Etobicoke, Ontario, Canada, M9C 5B6; John Perdue, 38 Harshaw Avenue, York, Ontario, Canada, M6S 1Y1

[21] Appl. No.: 162,953

[22] Filed: Dec. 8, 1993

[51] Int. Cl.⁶ .............................................. A01K 87/00
[52] U.S. Cl. .................................................... 43/25.2
[58] Field of Search ............................. 43/25.2, 42.4

[56] References Cited
U.S. PATENT DOCUMENTS

| | | | |
|---|---|---|---|
| D. 217,663 | 5/1970 | Chamberlain | 43/25.2 |
| 2,285,888 | 6/1942 | Benton | 43/25.2 |
| 2,849,825 | 9/1958 | Reisner | 43/25.2 |
| 3,418,742 | 12/1968 | Yaklyvich | 43/25.2 |
| 3,484,970 | 12/1969 | Wait | 43/25.2 |
| 3,722,128 | 3/1973 | Tremblay | 43/42.4 |
| 5,056,256 | 10/1991 | Trwax | 43/25.2 |
| 5,235,775 | 8/1993 | Daughtry | 43/25.2 |

*Primary Examiner*—Kurt Rowan

[57] ABSTRACT

A fish hook and lure cover is attachable directly to a fishing rod. The cover comprises a housing which contains the hook and lure with the housing having first and second ends, being opened at the first end to admit the hook and lure and having a fishing line receiving slot along the upper surface of the housing from the first end to the second end of the housing. The cover has a rod attachment clip located centrally along the underside of the housing with a clip mouth which opens downwardly diametrically opposite the line receiving slot. The clip is pushed onto the rod to provide a balanced mounting of the cover and the line is loaded into the slot directly above and in the same direction as the clip is pushed onto the rod further enhancing the attachment of the cover to the rod.

2 Claims, 4 Drawing Sheets

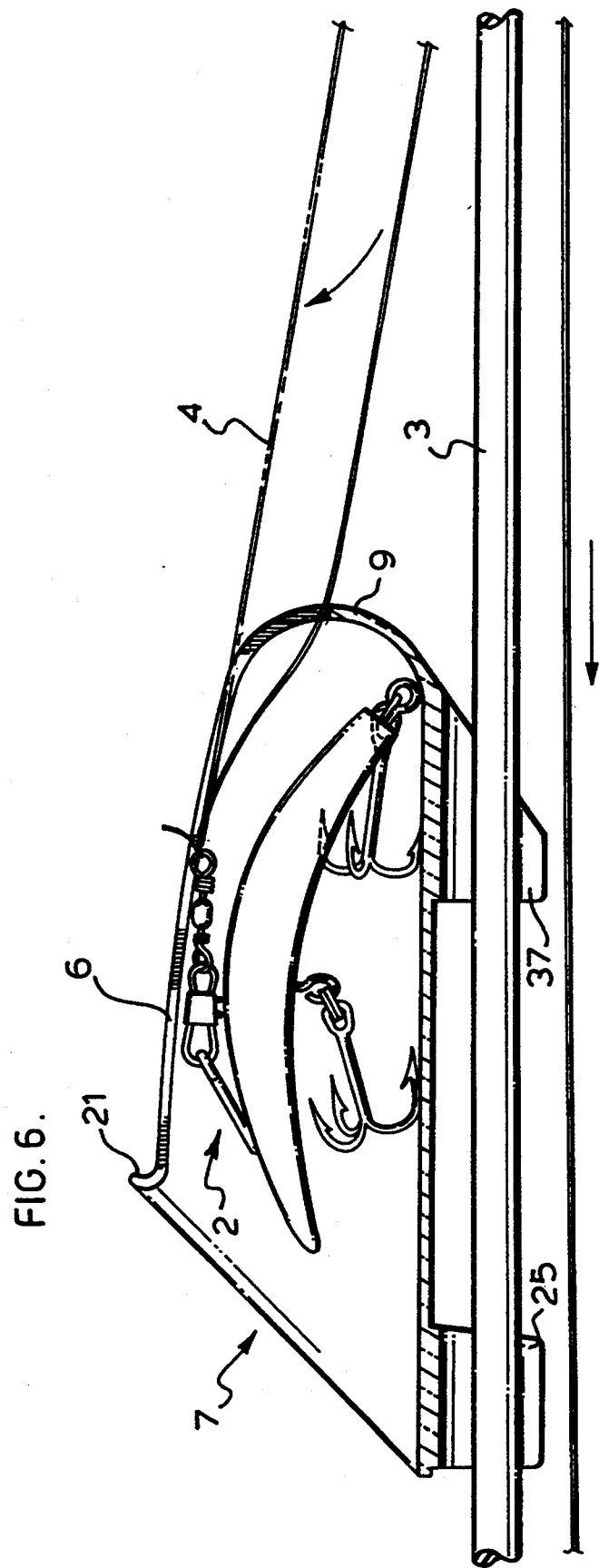

FISH HOOK AND LURE COVER

FIELD OF THE INVENTION

The present invention relates to a protective hook and lure cover which mounts directly to a fishing rod.

BACKGROUND OF THE INVENTION

As anyone who has handled a fishing rod will appreciate, the hook and lure at the end of the line when not in use presents a potential safety hazard. Most people engage the hook with one of the rod loops and tighten the line to prevent the hook from releasing from the rod. This is only marginally effective because the hook is not fully covered and further the hook has a tendency to release from the loop. Furthermore, many lures have a series of hooks which can not be effectively hidden by the rod in this manner.

Different proposals have been made to overcome the above problem. Examples of these proposals are shown in U.S. Pat. No. 5,056,256 issued Oct. 15, 1991 to Truax, U.S. Pat. No. 4,452,003 issued Jun. 15, 1984 to Deutsch, U.S. Pat. No. 4,831,772 issued May 23, 1989 to Gillespie, U.S. Pat. No. 2,993,293 issued Jul. 25, 1961 to Blout, U.S. Pat. No. 4,015,361 issued Apr. 5, 1977 to O'Reilly and U.S. Pat. No. 2,767,502 issued Oct. 23, 1956 to Reynolds.

The Gillespie, Deutsch, Blout, Reynolds and O'Reilly constructions are all in the form of box-like structures which must be opened to insert the hook and/or lure and which must then be snapped shut in order to trap the hook and/or lure in position. This can be particularly awkward if the user has only one hand free to both place the hook in position and to open and close the hook container.

The O'Reilly and Gillespie structures require a separate attachment piece to first be fitted to the rod with the hook container then securing to that separate attachment piece.

The Blout structure has a clip located on one side of the rod with the clip being normally closed but being bendable to an open position to fit around the rod. Again, this is awkward to mount to the rod, particularly when only one hand is available.

In the Reynolds construction, the hook and lure container must be held open after the hook and lure are inserted and the container snaps closed directly around the rod to hold it in position. Again, this is an awkward operation.

In the Deutsch construction, a separate side clip is provided which attaches to one of the line loops on the rod. The attachment of the container in this particular case is relatively simple, however it places stress on the weakest part of the rod, i.e. at the loop.

The Truax construction comprises an open ended housing for receiving hooks and lures. The fitting of the hooks and lures into this open ended housing would appear to be much simpler than what is required in the other prior art references referred to above.

Truax shows two different ways of mounting the container to a fishing rod. One of those methods requires the use of VELCRO ™ fasteners provided on both the rod and to the inside of the housing. The other of those methods uses a series of clips spaced from one another at different locations around the container housing. The clips vary in size for fitting with various different rod diameters. Two of the clips are located about 90° from the line fitting slot of the Truax housing and if either of these clips are used, the housing sits off to one side of the rod where it is readily exposed to be jarred from the rod.

One of the Truax clips is located at the base of the housing but again, opens sideways relative to the direction in which pressure would be applied on the housing for inserting the hooks and lure into the Truax construction. This sideways opening clip is not on its own able to accommodate different rod thicknesses and further does not provide a mounting that would resist the housing from being knocked sideways off of the rod.

SUMMARY OF THE INVENTION

The present invention provides a fish hook and lure cover which attaches to a rod. The cover includes a housing to receive the fish hook and lure and clip means on the underside of the housing for mounting the housing to the rod. The housing has a first open end and a centrally located fishing line receiving slot along the upper side of the housing from the first open end to the opposite end of the housing. The clip means to the underside of the housing comprises a pair of resilient clip arms which are spaced from one another to define a clip mouth which then widens to a rod fitting gap defined between the clip arms. The clip mouth opens downwardly diametrically opposite the line receiving slot on the upper side of the housing. The cover is attached to the rod by pushing the clip down onto the rod where the clip provides a balanced mounting of the cover and when in use, the line on the rod is loaded into the slot directly above and in the same direction as the clip is pushed on the rod further enhancing the attachment of the cover to the rod.

The provision of downwardly extending clip arms on the bottom of the housing also enable the provision of a series of different sizes of rod fitting gaps in a single clip arrangement with all of the gaps being located directly beneath the housing and all diametrically opposite the line opening slot in the upper side of the housing.

BRIEF DESCRIPTION OF THE DRAWINGS

The above as well as other advantages and features of the present invention will be described in greater detail according to the preferred embodiments of the present invention in which;

FIG. 6 is a view similar to FIG. 5 showing the lure and hooks in final positions in the cover.

DETAILED DESCRIPTION ACCORDING TO THE PREFERRED EMBODIMENTS OF THE PRESENT INVENTION

Figure 1:
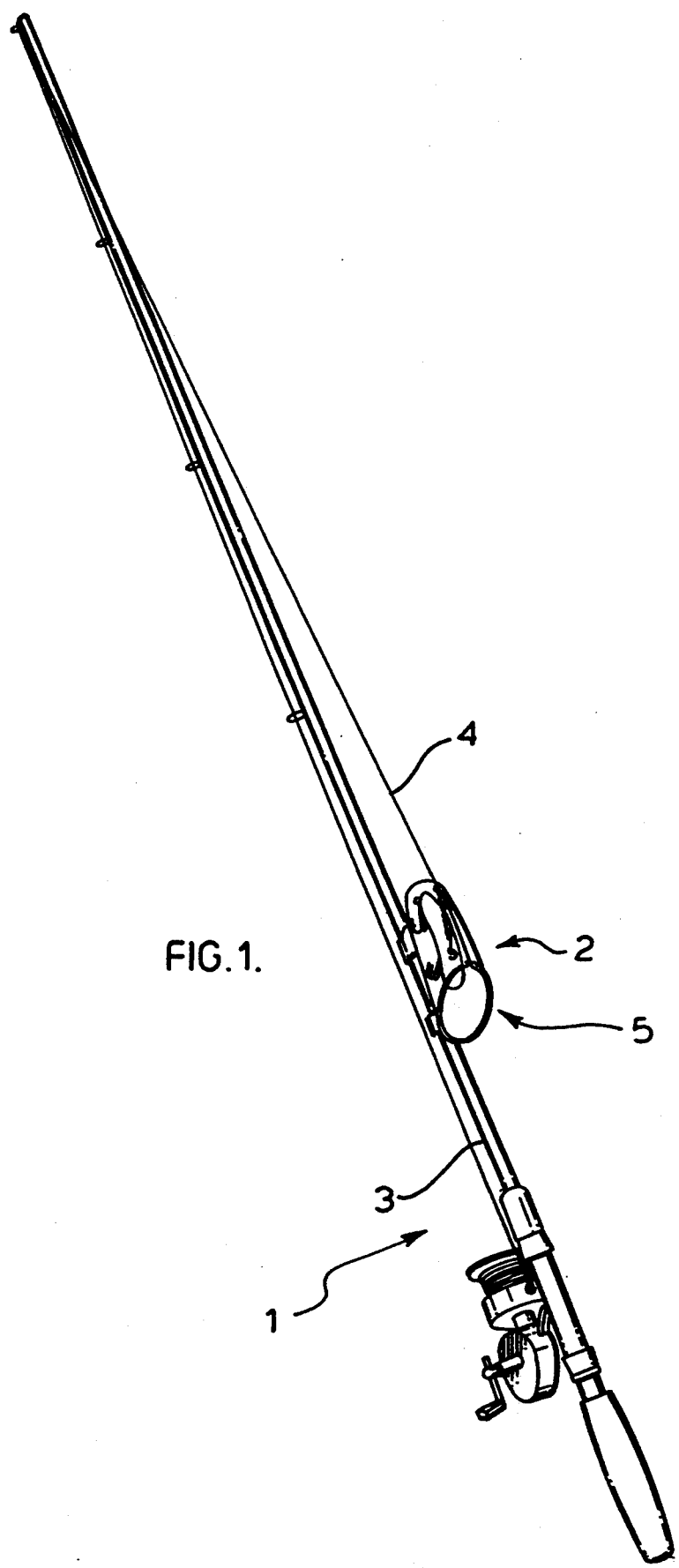
FIG. 1 is a perspective view of a fishing rod with a protective hook and lure cover fitted to the rod.
Figure 2:
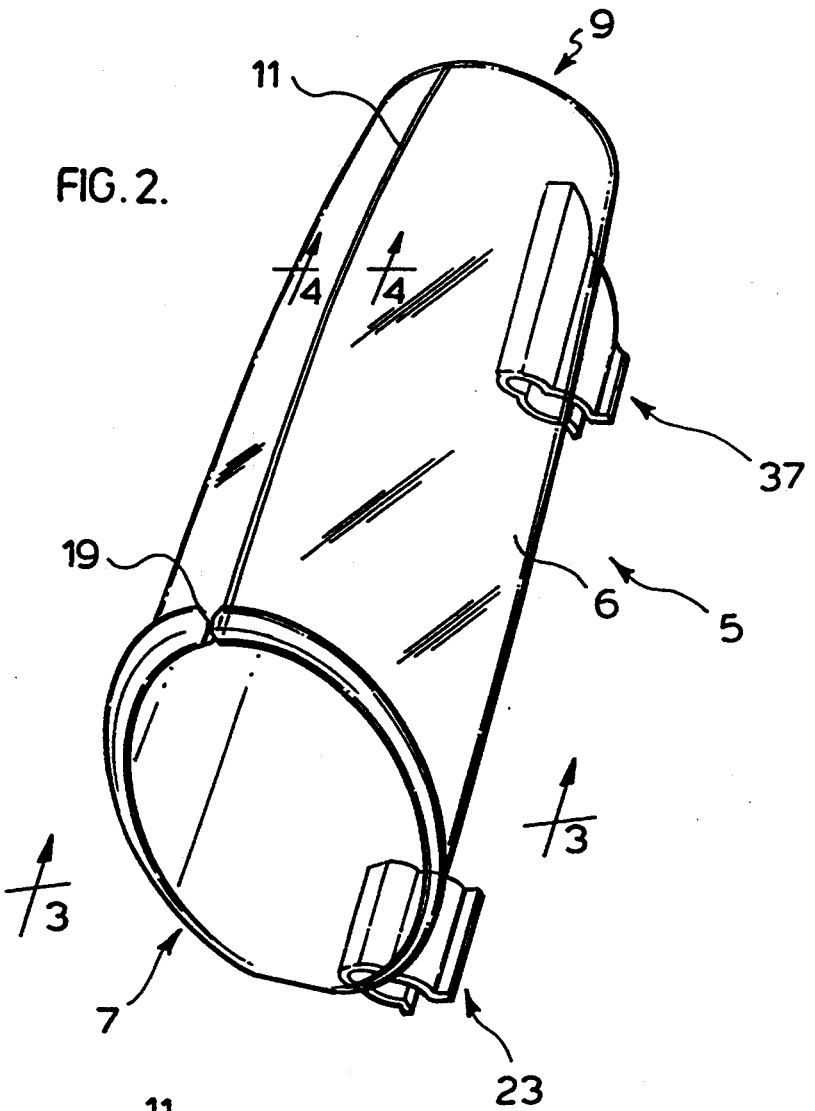
FIG. 2 is a top perspective view of the hook and lure cover when removed from the rod of FIG. 1.

FIG. 1 shows a fishing rod set up generally indicated at 1. This set up includes the actual rod 3 with a lure and hook combination 2 fitted to the end of the line 4 on the rod. The rod, line and lure with associated hooks are all well shown in FIGS. 5 and 6 of the drawings.

According to the present invention, a protective cover for the lure and associated hooks is, generally indicated at 5. This cover comprises a housing 6 with rod attachment clips provided to the underside of the housing.

In the preferred embodiment, housing 6 has a transparent plastic construction. The transparency of the housing allows viewing of the lure and hooks while they are trapped in the housing.

The plastic used in forming the housing, which is also the same plastic used in forming the clips, is relatively rigid and extremely shatter resistant.

Figure 3:
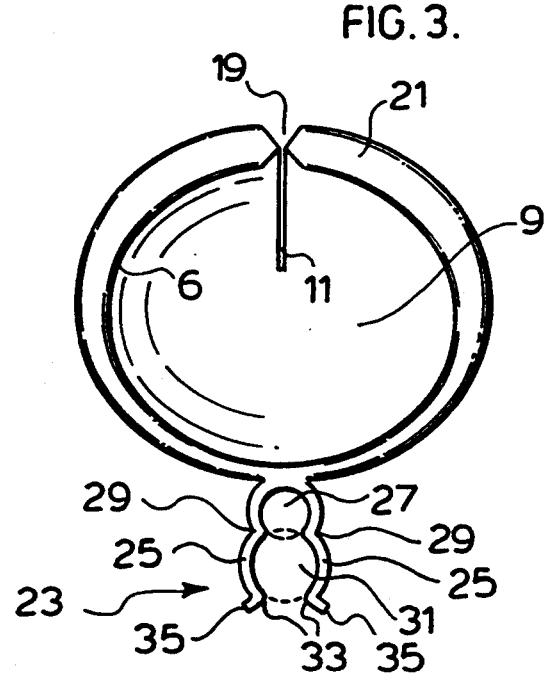
FIG. 3 is an end view of the cover of FIG. 2.

When in use, cover 5 has a top and a bottom side. The attachment clip is provided on the bottom or underside of the cover and the top side of the cover includes a line receiving opening or slot 11 running from the open forward end of the cover generally indicated at 7 along the length of the housing to the rearward end 9 of the housing which is closed other than where the slot 11 curves around and down into the rearward end of the housing as seen in FIG. 3 of the drawings. Note that the open end of the housing is cut at an angle as shown in the drawings.

As also seen in FIG. 3 of the drawings slot 11 is located centrally of the housing 6. The slot starts from an outwardly diverging V-shaped slot mouth 19 at the forward end of the housing which is provided with a radially extending lip 21 enlarged towards the upper side of the housing and narrowing towards the lower side of the housing.

Slot 11, other than at the slot mouth 19 is defined by rounded shoulders 15 to the outside of housing 6 and by much more sharply angled corners 17 to the inside of the housing. This overall shaping of the slot substantially adds to the ease with which the fishing line can be inserted in the housing while deterring inadvertent release of the line from the housing.

In another embodiment of the invention, the housing is at least partially painted with fluorescent paint as for example, around the raised rim 21 which will still allow interior viewing while providing illumination of the housing for night use.

The exterior surface of the housing is generally rounded with a specific inward taper to be described later in detail. The general rounding of the housing avoids both the fishing line and the user from being exposed to any cutting edges and the like.

The rounded tapered shape of the housing in which it narrows from the open end 7 to the closed end 9 provides a natural guard so that the housing resists being knocked off of the rod as the rod is carried with its outer end forward through treed areas and the like. There are no sharp edges on the housing which might otherwise catch on a tree branch, etc., and anything that does hit the housing will tend to deflect off of the tapered housing shape.

One of the important keys to the present invention resides in the specific type of clip arrangement used for removably securing the cover to the rod. In particular, this clip arrangement comprises two sets of clip arms indicated at 23 and 37 respectively. Note from FIG. 6 that the set 37 of clip arms near the closed end of the cover is tapered to again eliminate any protruding edges which could provide a surface on which to snag the cover as it is carried through the bush. Also, both of these sets of clip arms have generally rounded exteriors other than at the extreme mouth of both sets of clips so that the cover over substantially all of its exterior surface is generally rounded.

Each clip set comprises a pair of clip arms as seen for example in FIG. 3 specifically showing clip set 23. This particular clip arrangement comprises a pair of clip arms 25 extending downwardly from the undersurface of the housing 6. Other than at the extreme upper end of the two arms they are completely free of the housing which even with their relatively rigid plastic construction ensures that they are resiliently deflectable relative to one another.

Each arm includes a lower end outwardly turned lip 35 defining a clip mouth between the two arms. As clearly seen in the drawings, this clip mouth opens downwardly diametrically opposite the upwardly opening slot 11 along the upper surface of the cover.

The clip mouth opens to a first rounded rod fitting gap 31 between the two clip arms 25. Each of the arms curves inwardly as indicated at 29 to define a further clip mouth region leading to a further rounded rod fitting gap 27 of lesser diameter than the gap 31.

A similar arrangement to that described immediately above for the set 23 of clip arms is found at the forward set 37 of clip arms.

As will be appreciated from the drawings, the two different sizes of rod fitting gaps 31 and 27 allow the cover to be positively secured to different sizes of rods. Furthermore, more than two different rod sizes are easily accommodated because the clip arms can be spread wider than that shown in FIG. 3 to effectively increase the size of each of the rod gaps so that for example, rod gap 31 will positively receive a rod having a diameter matching the gap size shown in FIG. 3 and will also accommodate rods of greater diameters than the gap spread shown in FIG. 3. A rod having a diameter smaller than gap 31 will fit in the rod gap 27 and again may have a slightly greater diameter than gap 27 which can be accommodated by a slight spreading of the two clip arms.

The downward free hanging of the two clip arms provides not only the benefits described above, but in addition allows the different rod gap sizes to be vertically stacked relative to one another all in line and diametrically opposite the line receiving slot in the cover.

Here it should be noted that more than the two rod gap sizes shown between the clips can also be used in the clip attachment.

In order to releasably attach cover 5 to rod 3 both of the clips sets 23 and 37 ar placed directly atop the rod. Using the housing 6 as a finger grip, one simply pushes down on the cover where the outwardly turned lower ends of each of the clip arms effectively provides a cam to cause the clip arms to spring slightly open relative to one another and allowing the rod to fit up into the appropriate gap opening 31 or 27 between the two clip arms. The amount of force required to spring the clips open is equal at all of the clip arms and because the clips open downwardly centrally of the cover, the housing itself provides a very effective tool to apply sufficient pressure on the clips to spring them over the rod. Furthermore, once the clips are in position, the housing is in a balanced mounting position on the rod, again because of the downward opening and central positioning of the clips.

Figure 5:
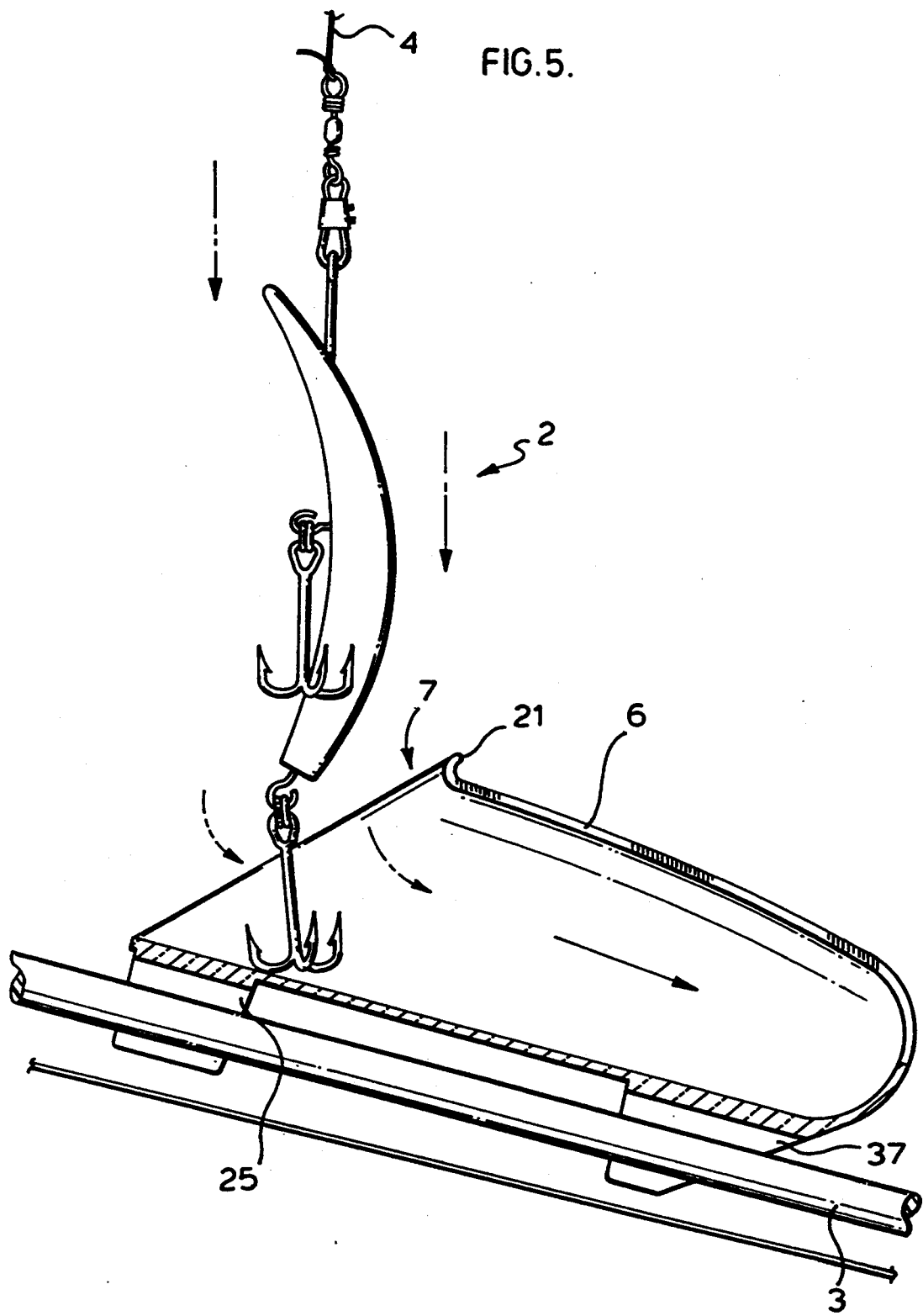
FIG. 5 is a sectional view through the cover of FIG. 1 and showing insertion of a lure and associate hooks into the cover.

The cover is preferably secured on the rod near the rod grip or handle as shown in FIG. 1 of the drawings. From here the operator tips the rod slightly downwardly and grips the lure as shown in FIG. 5 of the drawings. The operator holds the line so that the lure is then dropped into the cover, hooks first, through the forward open end 7 of the housing. This ensures that the hooks do not protrude from the end of the housing. Note that because of the angling, the open mouth of the housing becomes more exposed as the rod is tipped downwardly to ease the loading of the lure and hooks into the cover. Also, the curving of lip 21 provides a deflector for guiding the loading of the lure and hooks.

Figure 4:
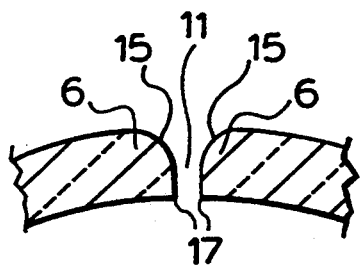
FIG. 4 is an enlarged sectional view along the lines 4—4 of FIG. 2.

After the lure has been dropped into the housing, line 4 is then fit into the slot 11 with the fitting of the line being guided by the V-shaped entrance 19 at the turned lip 21 at the forward end of the housing. The V-shaped guide action of the mouth 19 substantially eases the fitting of the line into the slot. The turning of the lip ensures exposure of the slot mouth when the rod is tipped to different angles. Once the line is passed through mouth 19 and because the slot itself is located centrally along the rod, the line is almost automatically drawn into the remainder of the slot along the length of the housing. As earlier noted, in reference to FIG. 4, the rounded exterior shoulders 15 on the slot also provide a guide action for fitting the line into the slot. However, once the line is in position within the housing the more sharply angled interior slot edges 17 do not allow the line to easily jump out of the slot.

Once both the lure and the line have been properly fitted into the cover, the operator simply reels the line in to tighten the line interiorly of the housing and pulls the lure forwardly to the FIG. 6 position. Although the mouth of the cover is sufficiently large to provide an easy fitting of the lure into the housing, the narrowing of the housing towards its closed end 9 provides an automatic folding action of the hooks on the lure as shown in FIG. 6. In addition, the tightening of the line pulls it away from the slot so that the line is not exposed to the sharpened interior slot edges.

As will be understood from the above, and because the diametric positioning of the slot relative to the clip, the loading of the line into the cover is done in a direction which places any forces required to properly lead the line directly above the clip attachment. Furthermore, once the line is reeled in, the line pressure bears directly down onto the clip attachment enhancing the mounting of the cover to the rod.

A person either carrying or storing the rod is ensured that the lure and hooks are in a covered protected position. In order to use the rod, one simply releases the tension on and grips the line to pull both the line and the lure and hooks from the cover. The rod is then ready for normal use where one can fish either with or without the cover remaining on the rod.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A fish hook and lure cover which attach to a fishing rod, said cover comprising a housing having an upper side, a lower side and first and second ends, said housing being opened at said first end and having a fishing line slot centrally along said upper side thereof from said first end and extending to said second end of said housing, said cover having at least one rod attachment clip comprising a pair of symmetrical spaced apart resilient clip arms extending downwardly from and to either side of center of said lower side of said housing with an open clip mouth between said clip arms, said open clip mouth being diametrically opposite said line receiving slot, said clip arms having first arcuate arm portions directly adjacent said housing sand second arcuate arm portions spaced from said housing by said first arcuate arm portions to respectively define first and second rounded rod fitting gaps between said first and second arcuate arm portions and said first rod fitting gap being smaller than said second rod fitting gap and said slot being bordered lengthwise thereof to either side by top edges which are rounded exteriorly of said housing and by bottom edges which are flattened interiorly of said housing.

2. A fish hook and lure cover which attaches to a fishing rod, said cover comprising a housing having an upper side, a lower side and first and second ends, said housing being opened at said first end and having a fishing line slot centrally along said upper side thereof from said first end and extending to said second end of said housing, said cover having at least one rod attachment clip comprising a pair of symmetrical spaced apart resilient clip arms extending downwardly from and to either side of center of said lower side of said housing with an open clip mouth between said clip arms, said open clip mouth being diametrically opposite said line receiving slot, said clip arms having first arcuate arm portions directly adjacent said housing sand second arcuate arm portions spaced from said housing by said first arcuate arm portions to respectively define first and second rounded rod fitting gaps between said first and second arcuate arm portions and said first rod fitting gap being smaller than said second rod fitting gap, and said cover includes an outer lip at said first end of said housing with said outer lip being curved towards said second end of said housing and said outer lip being provided with a slot mouth which is widened relative to said fishing line receiving slot.

* * * * *